Feb. 9, 1971   R. C. MAROLF ET AL   3,561,052
APPARATUS FOR FORMING PARISONS AND CONTROL MEANS THEREFOR
Filed Jan. 12, 1968   4 Sheets-Sheet 1
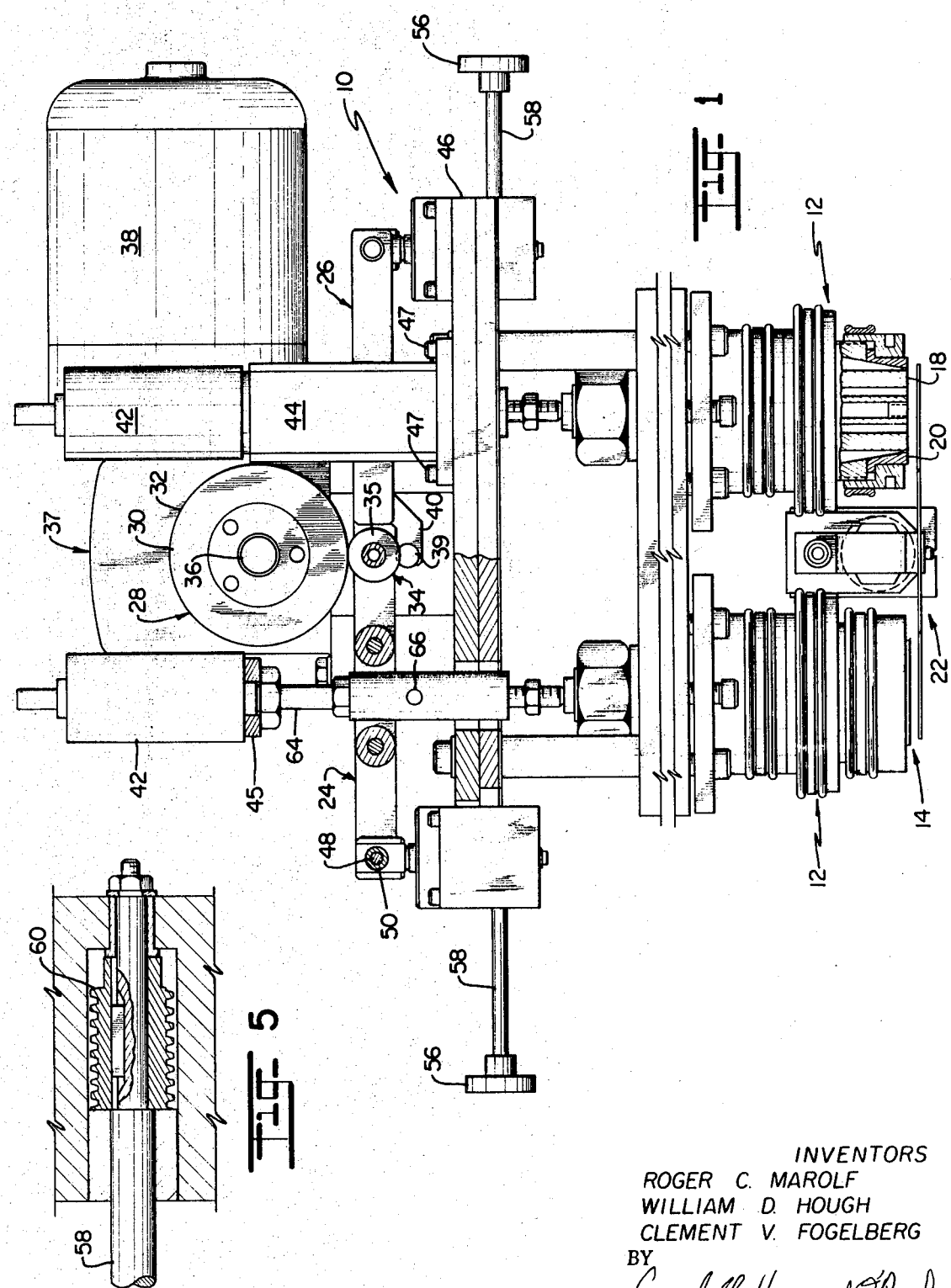
INVENTORS
ROGER C. MAROLF
WILLIAM D. HOUGH
CLEMENT V. FOGELBERG
BY
Campbell, Harris and O'Rourke
ATTORNEYS

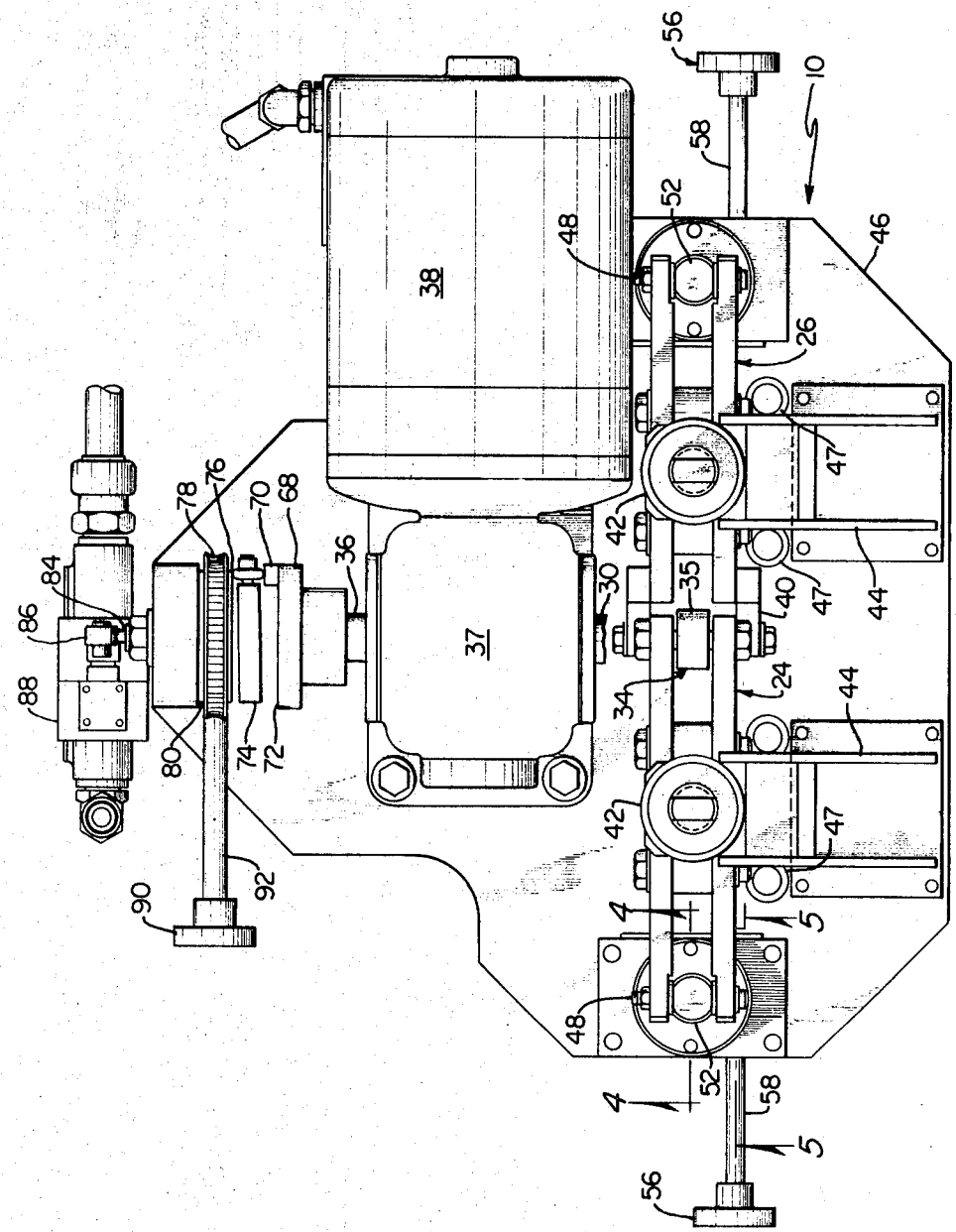

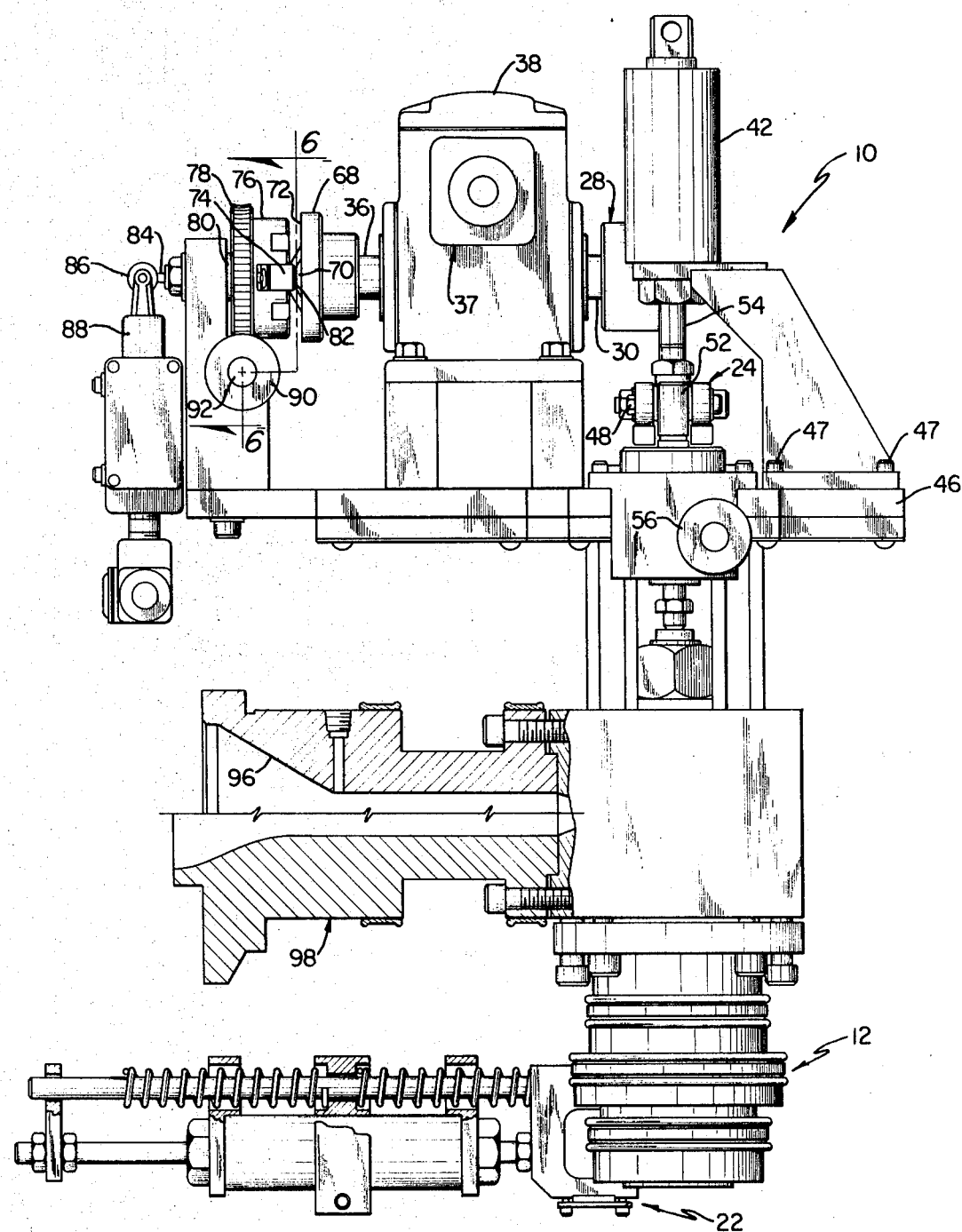

INVENTORS
ROGER C. MAROLF
WILLIAM D. HOUGH
CLEMENT V. FOGELBERG
BY
*Campbell, Harris and O'Rourke*

ATTORNEYS

United States Patent Office 3,561,052
Patented Feb. 9, 1971

3,561,052
APPARATUS FOR FORMING PARISONS AND CONTROL MEANS THEREFOR
Roger C. Marolf, Boulder, William D. Hough, Arvada, and Clement V. Fogelberg, Boulder, Colo., assignors to Ball Corporation, a corporation of Indiana
Filed Jan. 12, 1968, Ser. No. 697,482
Int. Cl. B29d 23/04
U.S. Cl. 18—14                    3 Claims

ABSTRACT OF THE DISCLOSURE

An apparatus for controlling the wall thickness and weight of a pair of simultaneously extruded plastic tubings. The apparatus includes a programmer for controlling the weight and wall thickness of each of a pair of simultaneously extruded tubings, said programmer being constructed for use with an extruder head having a pair of outlet orifices, each orifice being formed by first and second members, one of said members being mounted for relative movement with respect to the other member. The programmer comprises means for programming the wall thickness and weight of the plastic tubings to be formed, means controlled by said programming means and constructed for effecting, during the extruding of plastic tubings, simultaneous movement of both of the first members of the extruder relative to the second members in the same direction by the same amount to vary the wall thickness and weight of both of the plastic tubings to be extruded, and means constructed for positioning the first member of one of the orifices of the extruder in a predetermined manner with respect to the position of the first member of the other orifice.

BACKGROUND OF THE INVENTION

Heretofore, many methods and apparatus have been proposed for extruding a parison or plastic tubing which can be used to form hollow plastic articles having wide variations in size, shape or strength requirements along its longitudinal length. Although many of these methods and apparatus have found useful application in the hollow plastic article industry, each have suffered from one or more disadvantages. For example, it has long been considered desirable to extrude simultaneously a pair of plastic tubings from the same extruder thereby increasing the rate of extrusion without increasing substantially the cost of the extruder to be used or the amount of floor space required therefor. Additionally, in order to increase the extrusion rate of plastic tubings and to meet the minimum weight requirements for the hollow plastic article so produced, it has long been considered desirable to use a single means for controlling simultaneously the wall thickness of a pair of plastic tubings which are extruded simultaneously. Only in this way, is it possible to insure that each of the simultaneously extruded plastic tubings will have the same wall thickness along the longitudinal length thereof as well as the same weight.

SUMMARY OF THE INVENTION

It has been found that each of the foregoing disadvantages may be easily and quickly overcome through the use of an apparatus and programmer therefor for controlling the wall thickness of a pair of simultaneously extruded plastic tubings wherein said apparatus comprises an extrusion means having a pair of variable annular outlet orifices, each outlet orifice being formed by first and second members, each outlet orifice being enlarged in size by movement of said first member in one direction relative to said second member and contracted in size by movement of said first member in the other direction relative to said second member, and means for effecting, during the extruding of plastic tubings, simultaneous movement, relative to said second members, of both of said first members in the same direction by identical amounts to vary the size of both said outlet orifices. The programmer of this invention is constructed for use with an extruder head having a pair of outlet orifices wherein each orifice is formed by first and second members and one of said members is mounted for relative movement with respect to the other of said members, said programmer comprising means for programming the wall thickness of the plastic tubings to be formed, means controlled by said programming means and constructed for effecting, during the extrusion of plastic tubings, simultaneous movement of both of the first members of the extruder head relative to the second members in the same direction by the same amount to vary the wall thickness and weight of both of the plastic tubings to be extruded, and means constructed for positioning the first member of one of the orifices of the extruder head in a predetermined manner with respect to the position of the first member of the other orifice.

Accordingly, one of the principal objects of this invention is to provide an apparatus and programmer therefor for controlling the wall thickness of a pair of simultaneously extruded plastic tubings along the longitudinal length thereof during the extrusion thereof.

Another object of this invention is to provide an apparatus for controlling the wall thickness of a pair of simultaneously extruded plastic tubings during the extrusion thereof through the use of a means for effecting simultaneous movement of one part of each of the outlet orifices contained within the extruder head relative to another part of each of said orifices whereby both of said one parts move in the same direction at the same time identical amounts to vary the size of the outlet orifices.

Another object of this invention is to provide a high speed machine for extruding simultaneously a pair of identical plastic tubings in combination with means for controlling the wall thickness of each of the extruded plastic tubings.

Another object of this invention is to provide an apparatus for controlling the wall thickness of a pair of simultaneously extruded plastic tubings as aforedescribed in which the means for effecting simultaneous movement of one part of each of the outlet orifices includes a pair of arms each of which is mounted for pivotal movement with respect to a corresponding one of said outlet orifices and each of which is attached to a corresponding one of said parts of said orifices, and means for effecting simultaneous pivotal movement of both of said arms whereby said one part of said outlet orifices move an identical amount in the same direction as the same part of the other one of said orifices.

Another object of this invention is to provide an apparatus for controlling the wall thickness of a pair of simultaneously extruded plastic tubings as aforedescribed in which the pivotal movement effecting means includes a cam member having a cam surface thereon wherein said cam surface is disposed in contacting engagement with a portion of one of said arms.

Another object of this invention is to provide an apparatus for controlling the wall thickness and weight of a pair of simultaneously extruded plastic tubings as aforedescribed in which the portion of one of said arms which is disposed in contacting engagement with a cam surface includes a cam follower mounted for rotation with respect to said arm, said cam follower also being disposed in contacting engagement with a cam follower mounted on the other arm whereby pivotal movement of one arm is transmitted to said member to the other said arm producing a corresponding pivotal movement of the other said arm.

Another object of this invention is to provide an apparatus for controlling the wall thickness of a pair of simultaneously extruded plastic tubings as aforedescribed including means for adjusting the position of said one part of each outlet orifice relative to a second part thereof, thereby establishing a basic wall thickness of tubing to be extruded through each outlet orifice.

Another object of this invention is to provide an apparatus for controlling the wall thickness of a pair of simultaneously extruded plastic tubings which includes means for severing the plastic material flowing through each orifice and means for actuating said severing means.

Another object of this invention is to provide an apparatus for controlling the wall thickness of a pair of plastic tubings as aforedescribed in which the actuating means for said severing means includes a switch means and means associated with a portion of said cam surface to effect actuation of mold switch means.

Another object of this invention is to provide an apparatus for controlling the wall thickness of a pair of plastic tubings as aforedescribed in which the switch actuating means is adjustably positioned with respect to the portion of said cam surface.

Another object of this invention is to provide a programmer for controlling the weight and wall thickness of each of the pair of simultaneously extruded plastic tubings, said programmer comprising means for programming the wall thickness and weight of the plastic tubings to be formed, means controlled by said programming means for controlling the size of the annular openings of each of a pair of annular orifices through which the plastic tubings are to be extruded, and means constructed for controlling the initial size of one of the annular orifices with respect to the initial size of the other annular orifice.

BRIEF DESCRIPTIONS OF THE DRAWINGS

Various other advantages and features of novelty will become apparent as the description proceeds in conjunction with the accompanying drawings, in which:

FIG. 1 is a front elevational view of an apparatus constructed in accordance with the subject invention with some parts removed for purposes of clarity;

FIG. 2 is a plan view of the apparatus shown in FIG. 1 with some parts removed for purposes of clarity;

FIG. 3 is a left-hand, elevation view, in partial cross section, of the apparatus shown in FIG. 1 with some parts removed for purposes of clarity;

FIG. 5 is a view, in partial cross section, taken along line 5—5 of FIG. 3; and

DESCRIPTION OF THE PREFERRED EMBODIMENT

Figure 6:
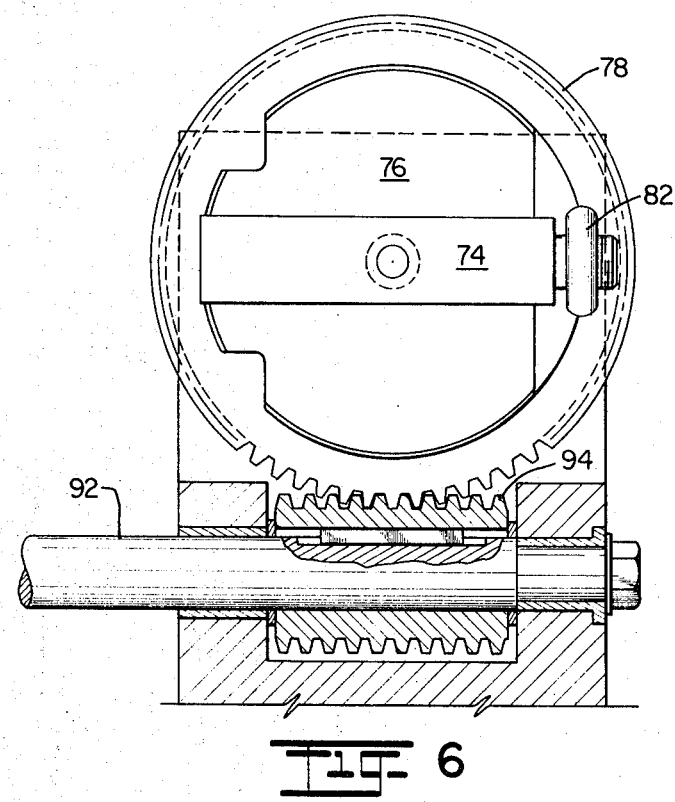
FIG. 6 is a cross sectional view taken along line 6—6 of FIG. 3.

Referring now to the drawings, in FIGS. 1–3 is shown a preferred embodiment of an apparatus 10 constructed in accordance with the subject invention. The apparatus 10 is constructed for controlling, during the extrusion operation, the wall thickness and weight of a pair of simultaneously extruded plastic tubings. The apparatus 10 comprises extrusion means 12 having a pair of variable annular outlet orifices 14 and 16. Each outlet orifiice includes first and second members 18 and 20, respectively. The size of each outlet orifice is enlarged by movement of the first member 18 in one direction relative to the second member 20 thereof. The first member 18 comprises a mandrel or a valve member while the second member 20 comprises an extrusion die which has a conically shaped, internal surface of decreasing diameter proceeding in a direction along the longitudinal length thereof toward the bottom of FIG. 1. The size of each outlet orifice is contracted by movement of said first member 18 in the opposite direction relative to said second member 20. The apparatus 10 also includes means for effecting, during the extruding of plastic tubings, simultaneous movement of both of said first members 18 in the same direction by identical amounts to vary the size of both said outlet orifices, and means 22 for severing the plastic material flowing through each orifice.

The means for effecting simultaneous movement of both of said first members 18 is shown as including a pair of arms 24 and 26 each of which is mounted for pivotal movement with respect to a corresponding one of said outlet orifices and each of which is attached to the corresponding one of said first members 18 of one of said orifices. The means for effecting simultaneous movement of both members 18 includes means 28 for programming the wall thickness of the plastic tubings to be formed, said means 28 being used for effecting simultaneous pivotal movement of both of said arms 24 and 26 whereby the first member 18 of one of said outlet orifices moves an identical amount in the same direction at the same time as the first member 18 of the other one of said outlet orifices. The means 28 for effecting pivotal movement of both of said arms comprises a cam member 30 having a cam surface 32 formed thereon, said cam surface 32 being disposed in contacting engagement with a portion 34 of one of said arms, such as arm 24. The cam member 30 is securely mounted upon and driven by a shaft 36 of the gear head 37 of the gear motor 38. The portion 34 of arm 24 which is disposed in contacting engagement with the cam surface 32 of cam member 30 comprises a cam follower 35 mounted for rotation with respect to said arm 24. Said cam follower 35 is also disposed in contacting engagement with another cam follower 39 mounted on the other arm 26 whereby pivotal movement of arm 24 is transmitted through the aforesaid cam follower 35 and 39 to the other arm 26 thereby producing a corresponding pivotal movement of arm 26. As shown in FIGS. 1 and 2, arm 26 includes a depending, bifurcated portion 40 having a rotatively mounted cam follower 39 attached thereto. Thus, it will be understood that the arms 24 and 26 are controlled by the programming means 28 to effect simultaneous movement of both of said first members 18 during the extrusion of the plastic tubings.

The apparatus 10 also includes means for biasing each of the arms 24 and 26 in a predetermined direction, said means including a pair of pressurized fluid cylinders 42 each of which has the housing thereof securely attached to a corresponding upstanding member 44 by means of a nut 45. Each upstanding member 44 is securely attached to the base 46 of the apparatus 10 by a plurality of bolts 47.

Figure 4:
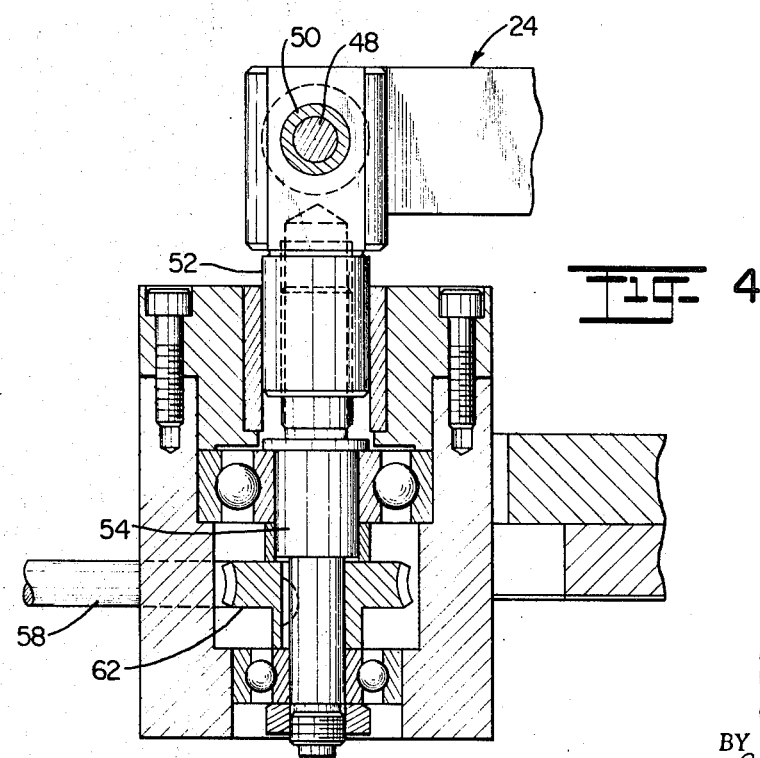
FIG. 4 is a cross sectional view of one of the means for changing the pivot point of one of the arms, said view being taken along line 4—4 of FIG. 2.

Each of the arms 24 and 26 is mounted for pivotal movement adjacent one end thereof by means of a pin member 48. Each pin member 48 is, in turn, mounted within a bushing or bearing 50 which is journaled within member 52. The elevation of the longitudinal axis of each pin member 48, and thus the pivot point about which each arm pivots, may be raised or lowered as desired or required. The raising or lowering of the pivot point is more readily understood by referring to FIGS. 5 and 6. The vertical position of member 52, said member 52 being threadedly mounted upon shaft 54, is raised or lowered by rotating the knob 56 which is securely attached to the horizontally disposed shaft 58. As shown in FIG. 5, the horizontally disposed shaft 58 has a worm gear 60 securely attached thereto. The worm gear 60 is enmeshed with a worm wheel 62, see FIG. 4. The worm wheel 62 is securely mounted upon the vertically disposed shaft 54 for rotation therewith. Thus, vertically disposed shaft 54 is rotated upon rotation of the worm wheel 62. Since member 52 is prevented from rotation as a result of its being pivotally mounted with respect to arm 24, rotation of the vertically disposed shaft 54 is translated into a vertical movement of member 54 either upwardly or downwardly. Thus, it will be understood that the worm gear and worm wheel arrangement shown in FIG. 5 is used to position a first member 18 of one of the orifices in a predetermined manner with respect to the position of the first member of the other orifice.

As previously indicated, the pressurized fluid cylinders 42 are used for biasing each of the arms 24 and 26 in a predetermined direction. The direction of bias depends upon a number of factors. First of all, the cam followers 35 and 39 must be maintained in a contacting engagement with each other and cam follower 35 must remain in contacting engagement with the cam surface 32 of the cam member 30. This is effected by directing pressurized fluid into each of the cylinders 42 in such a manner that each piston rod 64 of each cylinder 42 is urged in an upwardly direction. As shown in FIG. 1, piston rod 64 of the left hand cylinder 42 is attached to a pin 66. The pin 66 is disposed in contacting engagement with the lower surface of the arm 24. Although not shown in FIG. 1, a pin is similarly attached to the piston rod of the right hand cylinder 42 and disposed in a like manner with respect to the arm 26. Under some circumstances, it has been found that the pressure exerted upon the first member or mandrel 18 in the upwardly direction as a result of a plastic material being extruded through the outlet orifices is sufficiently great that some compensation not be made therefore. Under this situation, it is desirable to balance partially this upward force by reversing the flow of pressurized fluid into the cylinders 42 thereby causing each piston rod 64 to be urged downwardly. Since the amount of force being exerted in a downward direction is less than the amount of force exerted upon the first member or mandrel 18, the cam followers 35 and 39 will always remain in contacting engagement with each other and the cam follower 35 will remain in contacting engagement with the cam surface 32. This arrangement insures precise programming or positioning of each of the first members or mandrels 18 of each outlet orifice thereby producing precise wall thickness and weight control of the pair of plastic tubings as same are extruded.

In FIGS. 2, 3 and 6 is shown a means for controlling the severing means 22 and adjusting same whereby the plastic tubings are severed along their length at a point as determined by the position of a predetermined portion of the cam surface 32. As shown in FIGS. 2 and 3, the gear head 37 includes a common shaft 36 which extends outwardly from both sides of the gear head 37. The cam member 30 is securely mounted on one end of the common shaft 36 for rotation therewith. A circular plate 68 is securely mounted on the other end of the common shaft 36 for rotation therewith. Circular plate 68 has a raised or boss portion 70 formed on the outer surface 72 thereof. It will be understood that the boss portion 70 may comprise either a pin or a screw which is either press fit or threadedly mounted into the outer surface 72 of circular plate 68. An elongated member 74 is mounted for pivotal movement in a direction generally parallel with the longitudinal axis of a generally circular plate member 76. Plate member 76 is, in turn, securely mounted to worm wheel 78. Worm wheel 78 is mounted for rotation upon shaft 80. The longitudinal axis of shaft 80 is collinearly disposed with respect to the longitudinal axis of common shaft 36 disposed within the gear head 37. The elongated member 74 has an enlarged diameter portion 82 formed adjacent one end thereof and constructed to engage the boss portion 70 as circular plate 68 rotates upon shaft 36. When the enlarged diameter portion 82 engages the boss portion 70 of circular plate 68 upon rotation of circular plate 68, such contacting engagement causes the elongated member 74 to pivot. Pivotal movement of elongated member 74 is transmitted to a reciprocally mounted pin 84 which is biased in a direction to urge elongated member 74 into contacting engagement with the boss portion 70 of circular plate 68. Depression of pin 84 in this manner results in a force being transmitted to roller actuator 86 which is used to actuate a microswitch (not shown) that is positioned within the microswitch housing 88. Actuation of the microswitch (not shown) positioned within the microswitch housing 88 is used to control the operation of the severing means 22 and each of a plurality of blow-mold apparatuses (not shown).

Actuation of the microswitch contained within the microswitch housing 88 occurs each time the enlarged diameter portion 82 contacts the boss portion 70 of circular plate 68. The time of actuation is dependent upon the angular position or setting of elongated member 74. The angular position of elongated member 74 may be quickly and easily changed by rotating the worm wheel 78. Rotation of the worm wheel 78 is effected by rotation of a knob 90 which, in turn, rotates shaft 92 upon which the knob 90 is securely mounted. The shaft 92 has a worm gear 94 securely attached thereto and disposed in enmeshing engagement with worm wheel 78. Thus, the angular position of worm wheel 78 and the elongated member 74, which is mounted for rotation therewith, is controlled by the angular positioning of shaft 92. Due to the inherent construction of the worm gear and worm wheel, the angular position of elongated member 74 remains unchanged notwithstanding the vibratory motions which may be transmitted to the mechanism supporting same. In view of the foregoing, it will be readily appreciated that the microswitch is actuated in accordance with the location or position of a predetermined part of the cam surface 32 since the cam member 30 and the circular plate 68 are both securely mounted upon the common shaft 36 for rotation therewith.

Operation of the apparatus of this invention is now described. First of all, a cam member 30 having the proper cam surface 32 formed thereof is selected for the particular hollow plastic article to be produced. With respect to the configuration of the cam surface, it will be appreciated that cam surfaces for this application are formed through the use of empirical data. This means that nearly all cam surfaces being used to control the wall thickness and the weight of hollow plastic articles being formed today are produced upon a trial and error basis. Following the selection and the mounting of the cam member 30 the elongated member 74 is angularly positioned whereby the severing means 22 will be actuated at the proper time to sever the pair of plastic tubings at the beginning of each cycle of rotation of the cam member 30. Next, each of the first members or mandrels 18 is positioned one with respect to the other whereby each of the plastic tubings which are to be extruded through the outlet orifices will have the same basic wall thickness as well as the same weight. Normally, this is accomplished by adjusting each knob 56 until the lower end of each first member or mandrel 18 is flush with the lower end of the extrusion die 20. In this connection, it will be appreciated that the means for controlling the vertical position of the first members or mandrels 18 allow for dimensional differences resulting from normal manufacturing tolerances encountered in producing the various components of the apparatus of this invention. The final position of the first member or mandrel 18 of each outlet orifice is determined by comparing the weights of the plastic tubing extruded through one of the orifices with the weight of the plastic tubing extruded through the other orifice. When the weight of one plastic tubing equals the weight of the other plastic tubing, each first member or mandrel 18 is positioned identically with respect to the other first member or mandrel 18.

Plastic material is fed to each of the outlet orifices through the passage 96 formed in the cross head adapter 98 which is shown in FIG. 3. It will be understood that the plastic material being supplied to passage 96 has been subjected to a prerequisite pressure and elevated to the required temperature by suitable means (not shown) to permit extrusion thereof.

During the extrusion of the plastic tubings, the cam surface 32 of the cam member 30, the cam followers 35 and 39 and the fluid cylinders 42 control the vertical position of the first members or mandrels 18 at all times. Since the distance that the cam surface 32 is located from the center of cam member 30 varies with the angular setting or positioning of cam member 30, it will be appreciated that the vertical position of the lower end of each first member or mandrel 18 likewise varies in accordance with the particular portion of the cam surface 32 which is disposed in contacting engagement with the cam follower 35. It is this changing relationship which controls the wall thickness and the weight of the plastic tubings which are being simultaneously extruded. As previously indicated, the vertical elevation of the lower end of one of the first members 18 with respect to the vertical position of the other first member 18 is controlled by the vertical elevation of the pivot point of the arm to which said first member or mandrel is attached. Raising the vertical elevation of the pivot point of arm 24 results in raising the lower end of the first member or mandrel 18 of the outlet orifice 14. Further, it will be understood that the vertical elevation of the pivot point for one of the arms may be changed without effecting the vertical elevation of the pivot point of the other arm.

In view of the foregoing, it will be readily appreciated that a greatly improved apparatus and programmer therefor for controlling the wall thickness and weight of a pair of plastic tubings which are simultaneously extruded has been described. Further, as a result of the herein invention, it is possible to double the extrusion rate of plastic tubings through the use of a single extruding apparatus having a cost which is only slightly greater than the cost of a conventional extruding apparatus which is capable of extruding only one parison or plastic tubing at a time. Additionally, this increased extrusion rate is obtained without requiring additional floor space for the extruding apparatus. The apparatus of this invention also enables the simultaneous extrusion of a pair of plastic tubings each of which have the same wall thickness along the longitudinal length thereof and each of which have the same weight. Further, the apparatus of this invention permits the friction free adjustment of each of the first members or mandrels 18 while at the same time maintaining precise and accurate control over the positioning of each of said first members. The apparatus of this invention has decreased the cost of manufacturing hollow plastic articles by increasing the extrusion rate without increasing substantially the cost of the extruding machine and by holding to a minimum the amount of plastic material required to form each hollow plastic article.

It is to be understood that this invention is not limited to the exact embodiment of the apparatus shown and described, which is merely by way of illustration and not apparent to those skilled in the art, and it is therefore intended that the intended claims cover all such changes and modifications.

We claim:

1. A programmer for controlling the wall thickness and weight of each of a pair of simultaneously extruded plastic tubings, said programmer being constructed for use with an extruder head having a pair of annular outlet orifices, each orifice being formed by first and second members, one of said members being mounted for relative movement with respect to the other member, said programmer comprising: means for programming the wall thickness and weight of the plastic tubings to be formed, said programming means including a rotatably mounted cam member having a cam surface formed thereon; means controlled by said programming means and constructed for effecting, during the extruding of plastic tubings, simultaneous movement of both of the first members of the extruder head relative to the second members in the same direction by the same amount to vary substantially identically the wall thickness of both of the plastic tubings to be simultaneously extruded, said means for effecting simultaneous movement of both of the first members including a pair of generally collinearly aligned, pivotally mounted arms each of which is constructed for attachment to a corresponding one of the first members of the outlet orifices of the extruder head; and means for positioning the first member of one of the orifices of the extruder head in a predetermined manner with respect to the position of the first member of the other orifice, said means for positioning the first member of one of the orifices in a predetermined manner with respect to the position of the first member of the other orifice including means for changing the pivot point of at least one of said arms relative to the pivot point of the other one of said arms.

2. A programmer for controlling the wall thickness of each of a pair of simultaneously extruded plastic tubings, said programmer being constructed for use with an extruder having a pair of outlet orifices, each orifice being formed by first and second members, one of said members being mounted for relative movement with respect to the other member, said programmer comprising: means for programming the wall thickness of the plastic tubings to be formed; means controlled by said programming means and constructed for effecting, during the extruding of the plastic tubings, simultaneous movement of both of the first members of the extruder relative to the second members in the same direction by the same amount to vary the wall thickness of both of the plastic tubings to be simultaneously extruded, said means for effecting simultaneous movement of both of the first members including a pair of arms each of which is mounted for pivotal movement and each of which is constructed for attachment to a corresponding one of the first members of one of the outlet orifices of the extruder, and means for effecting simultaneous pivotal movement of both of said arms; and means constructed for positioning the first member of one of the orifices of the extruder in a predetermined manner with respect to the position of the first member of the other orifice, said means for positioning the first member of one of the orifices in a predetermined manner with respect to the position of the first member of the other orifice including means for changing the pivot point of at least one of said arms relative to the pivot point of the other one of said arms.

3. A programmer as described in claim 2 in which said programming means includes a cam member having a cam surface formed thereon that is disposed in contacting engagement with a portion of one of said arms and said portion of said one arm is disposed in contacting engagement with a portion of the other one of said arms.

References Cited

UNITED STATES PATENTS

| 3,283,363 | 11/1966 | Turner | 18—14X |
| 3,327,350 | 6/1967 | Limbach | 18—5X |
| 3,355,763 | 12/1967 | Willert | 18—5 |

FOREIGN PATENTS

| 707,250 | 4/1965 | Canada. |
| 1,247,323 | 10/1960 | France. |
| 918,946 | 2/1963 | Great Britain. |

CHARLES W. LANHAM, Primary Examiner

M. O. SUTTON, Assistant Examiner

U.S. Cl. X.R.

18—5